United States Patent [19]

Okajima

[11] 4,305,645

[45] Dec. 15, 1981

[54] MOTION PICTURE CAMERA

[75] Inventor: Hidekazu Okajima, Nakamachi, Japan

[73] Assignee: Canon Kabushiki Kaisha, Tokyo, Japan

[21] Appl. No.: 111,384

[22] Filed: Jan. 11, 1980

Related U.S. Application Data

[63] Continuation of Ser. No. 925,855, Jul. 18, 1978, abandoned.

[30] Foreign Application Priority Data

Aug. 9, 1977 [JP] Japan .................................. 52-95367

[51] Int. Cl.³ ............................................. G03B 31/02
[52] U.S. Cl. ....................................... 352/27; 352/29; 352/72; 352/177
[58] Field of Search ..................... 352/27, 29, 72, 174, 352/176, 177

[56] References Cited

U.S. PATENT DOCUMENTS

| | | | |
|---|---|---|---|
| 3,603,678 | 9/1971 | Anderl et al. | 352/174 |
| 3,825,327 | 7/1974 | Kosarko et al. | 352/27 |
| 3,958,868 | 5/1976 | Mizuki | 352/27 |
| 4,000,940 | 1/1977 | Komine et al. | 352/27 |
| 4,059,349 | 11/1977 | Komine et al. | 352/27 |
| 4,066,345 | 1/1978 | Freudenschuss et al. | 352/27 |
| 4,089,596 | 5/1978 | Krumbein | 352/27 |

Primary Examiner—Monroe H. Hayes
Attorney, Agent, or Firm—Toren, McGeady and Stanger

[57] ABSTRACT

In a motion picture camera capable of using a sound film, a blocking device for selectively stopping operation of a shutter and a shifting device for moving a pinch roller to or out of resilient contact with a capstan are controlled by a common electromagnetic device operating in response to actuation of a trigger device.

14 Claims, 8 Drawing Figures

MOTION PICTURE CAMERA

This is a continuation of application Ser. No. 925,855, filed July 18, 1978 now abandoned.

BACKGROUND OF THE INVENTION

1. Field of the Invention:

This invention relates to motion picture cameras.

2. Description of the Prior Art:

The motion picture camera as well as the general-purpose camera has been required to meet demands not only for high imaging performance but also for reduction in bulk and weight so as to be convenient to the photographer in management, for increase in reliability in operating the camera.

To record image information on a film strip of long length in a series of still pictures, there is provided a film feed device for intermittently advancing the film past an image gate in combination with a shutter device arranged to be driven in synchronism with the film feed device in such a manner that one picture frame of the film is exposed as the shutter device is opened when the film feed device stops the film from advancement, and the exposure is blocked when the film is driven to advance. The film feed device and the shutter device operate with a common driving motor so long as a release device is actuated by a trigger device, the latter being arraged to be accessible from the outside of the camera housing. The methods of establishing the responsive relation between the trigger and release devices employed in the presently available motion picture cameras may be divided into two main categories: the first is to make use of a mechanical linkage responsive to the operation of the trigger device to be acted on the release device; and the second is to make use of an electromagnetic means electrically connected to the trigger device through switch means.

The disadvantages of the former are that the photographer is required to exert a very large force in assuring effective operation of the trigger device along with the release device by his finger on which a large proportion of his attention must be concentrated; further, it is impossible to make use of a wireless remote control, and, still further, the use of the mechanical linkage leads to an increase in the complexity of the associated mechanisms.

The latter method has overcome the aforesaid disadvantages, since there is provided the electromagnetic means for the release device which is electrically connected to the trigger device, and all that the trigger device has to do is to control the electrical power supply to the electromagnetic device. Therefore, the magnitude of force necessary to operate the trigger device is largely reduced to enable the photographer to save the load of his finger. The use of the electromagnetic means is advantageous in performing wireless remote control photography. Further, because of the lack of the mechanical linkage as in the former method, the design flexibility of the camera mechanisms is increased. The only problem arising in the employment of the latter method is how to reduce consumption of electrical energy of a battery which amounts to a far larger level than is expected. When the number of batteries necessary to be used at a time in the camera is increased, it is unavoidable to sacrifice the aforesaid demand for minimization of the size and weight of the camera. On this account, the latter method must be embodied by realizing a provision for permitting the electromagnetic means to operate with as low an electrical power supply as possible.

The foregoing discussion generally applies to the various types of motion picture cameras.

Of the presently available films for use with motion picture cameras, there are what is called "silent film" adapted to optically record picture information alone, and what is called "sound film" capable of recording not only picture information optically but also sound information magnetically.

One example of the round film is disclosed in U.S. Pat. No. 3,858,968 of Eastman Kodak Company and is sold from the same company under the trade name of "Sound Movie Film". This film has a track of magnetic recording material as applied on a film strip which is conventionally usable as a silent film along one side edge on the surface thereof and is accommodated in a cassette similar to the silent film, so that when the sound film is used, the photographer need only to load the cassette by itself into a chamber provided in the camera housing. Unlike the silent film cassette, however, the cassette for the sound film is designed to have not only a window as an exposure aperture but also a cutout or recess for sound recording station, the window and recess being spaced apart from each other but in a common film channel through which the sound film is passed from a supply spool to a take up spool mounted on a common shaft of the supply spool in the cassette housing.

For such sound film, there have been developed many sound motion picture cameras, as for example, shown in U.S. Pat. Nos. 3,771,864, 3,825,327, 3,880,504 and T920009 (Defensive Publication), and DOLS Nos. 2,254,664 and 2,417,095. The essential feature of these cameras is that there are provided what is lacked in any silent motion picture camera which is adapted for use with silent film known in the art from very old times, namely, a sound recording circuit device having a magnetic head for magnetic recording of sound information on the aforesaid sound track, and an additional film feed device adapted to transport the film at a substantially constant speed past the sound recording station, while the film is intermittently advanced past the picture taking station.

The second film feed device for continuously transporting the film at a substantially constant speed with reference to the magnetic head is generally constructed to include a capstan arranged to be driven for rotation at a constant speed and a pinch roller arranged upon actuation of a suitable member to press the film against the capstan in a resilient manner. For this purpose, while the capstan is usually made of solid material such as metal, the pinch roller is formed to an elastic ring by use of rubber, for example, and this ring is mounted to surround a metal core. This construction of the second film feed device assures the constant speed of transportation of the film with the help of the elastic ring.

Since the pinch roller of such construction is susceptible of plastic deformation, it is required to move the pinch roller away from the capstan whenever the capstan is stopped, or otherwise the so-deformed ring of the pinch roller would give bad influence to the sound recording. Therefore, all the sound motion picture cameras and also the audio instruments having at least a capstan and a pinch roller for transportation of a film or tape have a provision for controlling the film or tape feed device of the capstan and pinch roller in such a manner that only when the film or tape is transported, the pinch roller is allowed in resilient contact with the capstan. In this manner, the pinch roller is prevented from being deformed by the pressure which would be otherwise effected when the pinch roller is left in resilient contact with the capstan after the capstan is stopped. The creation of a gap between the capstan and the pinch roller when not in use provides an additional advantage of making the loading operation of the cassette easier.

It is known to provide many methods of selectively controlling the position of the pinch roller relative to the capstan, as, for example, disclosed in U.S. Pat. No. 3,880,504, wherein a shifting device for the pinch roller is mechanically linked to the trigger device. This arrangement gives rise to a problem that the photographer's finger acting on the trigger device cannot endure the stress for a longer time than when the trigger device is associated with the aforesaid release device along. Particularly with the sound motion picture camera, when the photographer's finger is tired so as not to exert a sufficient force in depressing the trigger device, the pressure of the pinch roller against the capstan varies to so large an extent that it is impossible to maintain the speed of transportation of the film at a constant level.

One proposal for solving this problem is disclosed in DOLS No. 2,417,095, wherein the shifting device is provided with electromagnetic means though it is uncertain whether or not this electromagnet means is utilized to actuate the release device, as arranged to cooperate with the trigger device through a switch for controlling electrical power supply to the electromagnetic means. By the use of this electromagnetic means, the picture and sound recording characteristics of the camera is stabilized against the variation of force of the photographer's finger on the trigger device, since the engagement of the pinch roller with the capstan is established with an always constant pressure.

The mere combination of DOLS No. 2,417,095 with the known method of application of electromagnetic means to the release device, that is, the fact that the shifting and release devices are actuated by separate electromagnetic means, however, will lead to an increase in the amount of consumption of electrical energy to effect an equivalent result of picture and sound recording. As has been mentioned above, the intensity of current necessary to assure the effective operation of each electromagnetic means is comparatively large, so that there is need for the camera to accommodate a number of additional batteries for the additional electromagnetic means. This calls for a large increase in the bulk and weight of the motion picture camera.

SUMMARY OF THE INVENTION

A first object of the present invention is to provide a motion picture camera which has overcome the above-mentioned drawbacks of the conventional motion picture camera and which is of small size and light weight and operates without the necessity of a large force in triggering.

A second object is to provide a sound motion picture camera in which a release device for controlling actuation of the shutter device and a shifting device for controlling the position of a pinch roller relative to the capstan are operated by a common electromagnetic means.

A third object is to provide a motion picture camera capable of selective use of silent film and sound film and having the common electromagnetic means for the release device and the shifting device arranged upon selection of the silent film to cooperate with means for preventing the shifting device from bringing the pinch roller into resilient contact with the capstan.

These and other objects and features of the present invention will become apparent from the following detailed description of a preferred embodiment thereof taken in conjunction with the accompanying drawings.

DESCRIPTION OF THE PREFERRED EMBODIMENT

With reference to FIGS. 3 to 8, one embodiment of a motion picture camera according to the present invention will be explained in detail.

Figure 1:
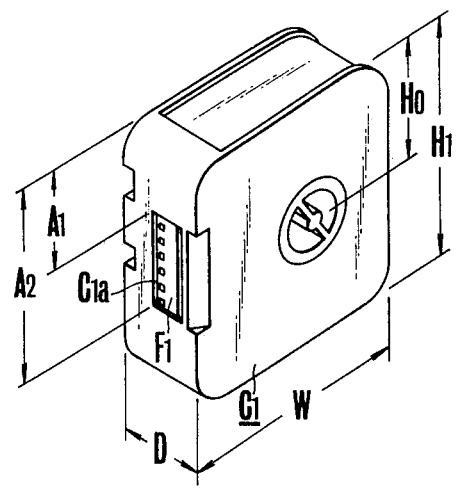
FIGS. 1 and 2 are perspective views of silent and sound film cassettes of the "Super 8" type respectively which resemble those sold at present from Eastman Kodak Company in shape.
Figure 2:
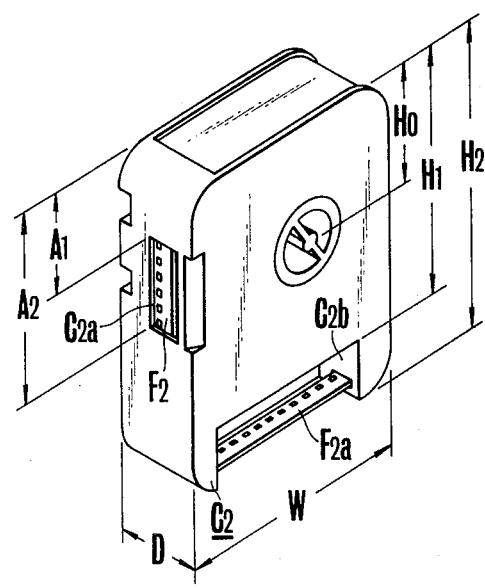

The motion picture camera has a housing 1 provided with a cassette-receiving chamber 1a for receiving either one of the film cassettes C1 and C2 of FIGS. 1 and 2 respectively. When the silent film cassette C1 of FIG. 1 is loaded in the chamber 1a as shown by double dot-and-single dash lines in FIG. 3, or when the sound film cassette C2 of FIG. 2 is loaded in the chamber 1a as shown by solid lines, a window C1a or C2a is aligned with an image gate 1b having an opening through which light entering through an objective lens 105 is passed to a film F1 or F2 at an image recording location. This alignment is accurately secured by a position adjusting member or abutment 18. The sound film cassette C2 is further provided with a cutout or recess C2b between two legs H1 and H2 in which the abutment 18 and a sound recording system are disposed when cassette C2 is seated in the chamber 1a. The silent film F1 is transported from a supply spool in the cassette C1 past a picture recording station behind the window C1a to a takeup spool on a common shaft of the supply spool. The sound film F2 is transported from a supply spool in the cassette C2 past a picture recording station behind the window C2a and then through the sound recording station in the recess C2b to a takeup spool on a common shaft of the supply spool. At the front side of a handle extending downwardly of the housing 1, there is shown a trigger button 106 biased by a compressed spring to project forwardly. When the trigger button 106 is depressed to a first stroke against the force of the compressed spring, a normally open switch SW2 is at first closed in engagement at its movable contact with a first collar which is fixedly mounted on a rod extending from the trigger button 106. Upon further depression of the trigger button to a second stroke, while the switch SW2 remains closed, a second switch SW3 is then closed in engagement at its movable contact with a second collar fixedly mounted on the rod. Thus, the trigger button 106 and switches SW2 and SW3 constitute a so-called two-step trigger mechanism. A microphone 107 has a wire terminating at a jack inserted in a plug on the front panel of the camera housing 1.

Figure 3:
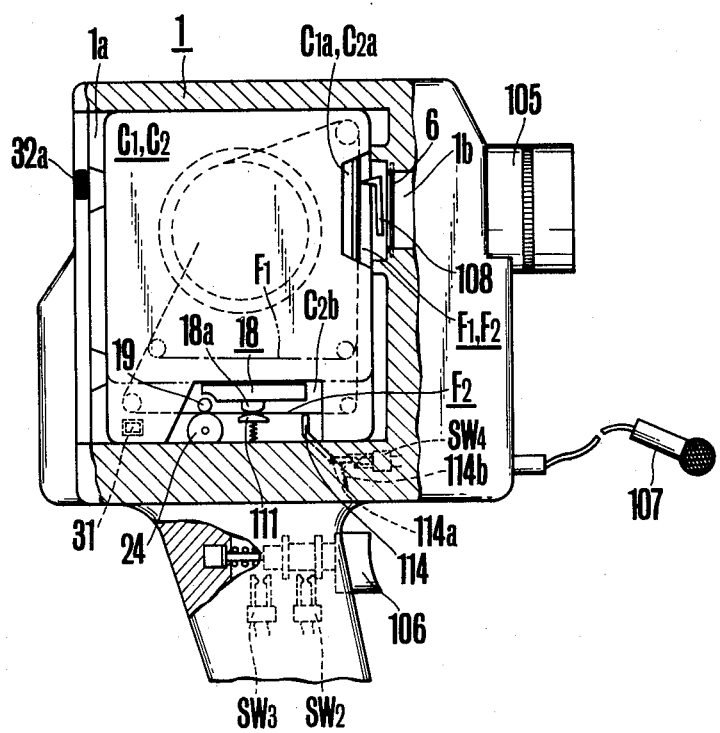
FIG. 3 is a side elevational view of one embodiment of a motion picture camera according to the present invention adapted for selective use of the cassettes of FIGS. 1 and 2 with a part broken away to illustrate the dual utility of the cassettes.

A first film transporting mechanism for transporting the film F1 or F2 stepwise along a path which extends behind the window C1a or C2a includes a pulldown 108 whose claw enters the perforations of film F1 or F2 and normally moves it downwardly, as viewed in FIG. 3, always by the length of a frame and at an automatically controlled frequency ranging from 16 to 20 frames per second. In the case of the sound film cassette C2, on its way beyond the window C2a, the film F2 is trained around an idler and then advances along a magnetic head 18a which is fixedly carried on the lower side of the aforesaid abutment 18. Located opposite the magnetic head 18a is a pressure pad 111 biased by a spring to press the film F2 against the magnetic head 18 when the sound recording system is rendered operative. The magnetic head 18 is followed by a capstan 19 which is mounted in the camera housing and driven by an electric motor Mc (FIGS. 6 and 7) through a pulley 47, an endless belt 48 and a flywheel 45 to rotate at a constant speed, and the film F2 passing along the capstan 19 is pressed thereagainst by a pinch roller 24. Disposed at a point between the picture taking and sound recording stations is a slack loop detector in the form of a lever 114 fulcrumed at a pivot 114a on the camera housing 1 and arranged upon detection of occurrence of a slack loop of film between the magnetic head 18 and the idler to open a switch SW4 controlling the speed of an electric motor MF (FIGS. 4 to 8) for the pulldown 108, as it is turned in a counter-clockwise direction from the illustrated position (FIG. 3) against the force of a bias spring 114b.

In this embodiment of the invention, when the motion picture camera is associated with the sound film cassette C2, although the average of the intermittent speed of the film F2 as it is transported by the pulldown 108 past the exposure aperture C2a is made almost equal to the constant speed as it is transported by the capstan 19 and pinch roller 24 past the sound recording station at C2b, that portion of the film F2 between the film gate 1b and the magnetic head 18a is varied in length to some extent during one cycle of claw operation. In more detail, for the first half of each cycle of claw operation, the length of the above-defined film portion is increased by one frame at most, causing the detector 114 to be turned counter-clockwise by the so-formed slack loop of film to thereby open the switch SW4. For the second half cycle, the slack loop is gradually decreased to a predetermined small or zero level at which the switch SW4 is closed again. In other words, the opening and closing operation of the switch SW4 is repeated once for each cycle of claw operation.

Figure 4:
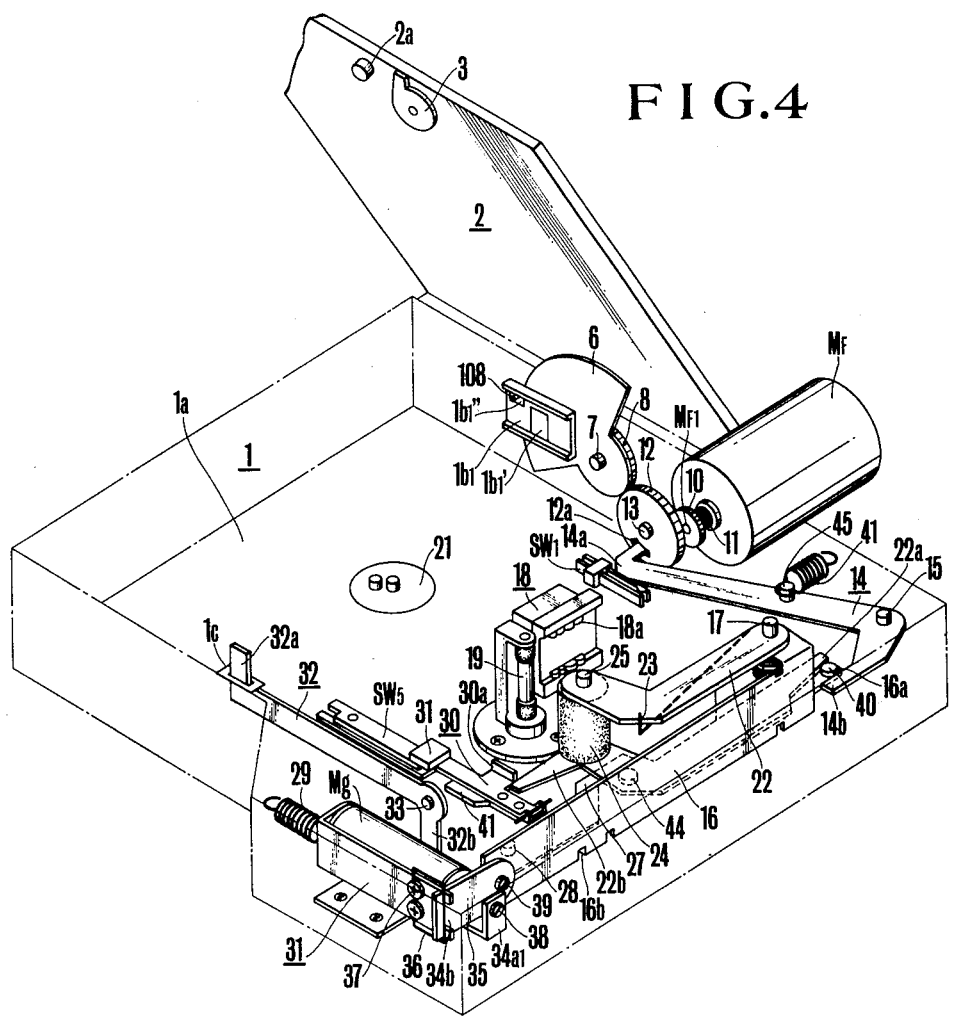
FIG. 4 is a perspective view of the basic parts of the camera of the invention.
Figure 5:
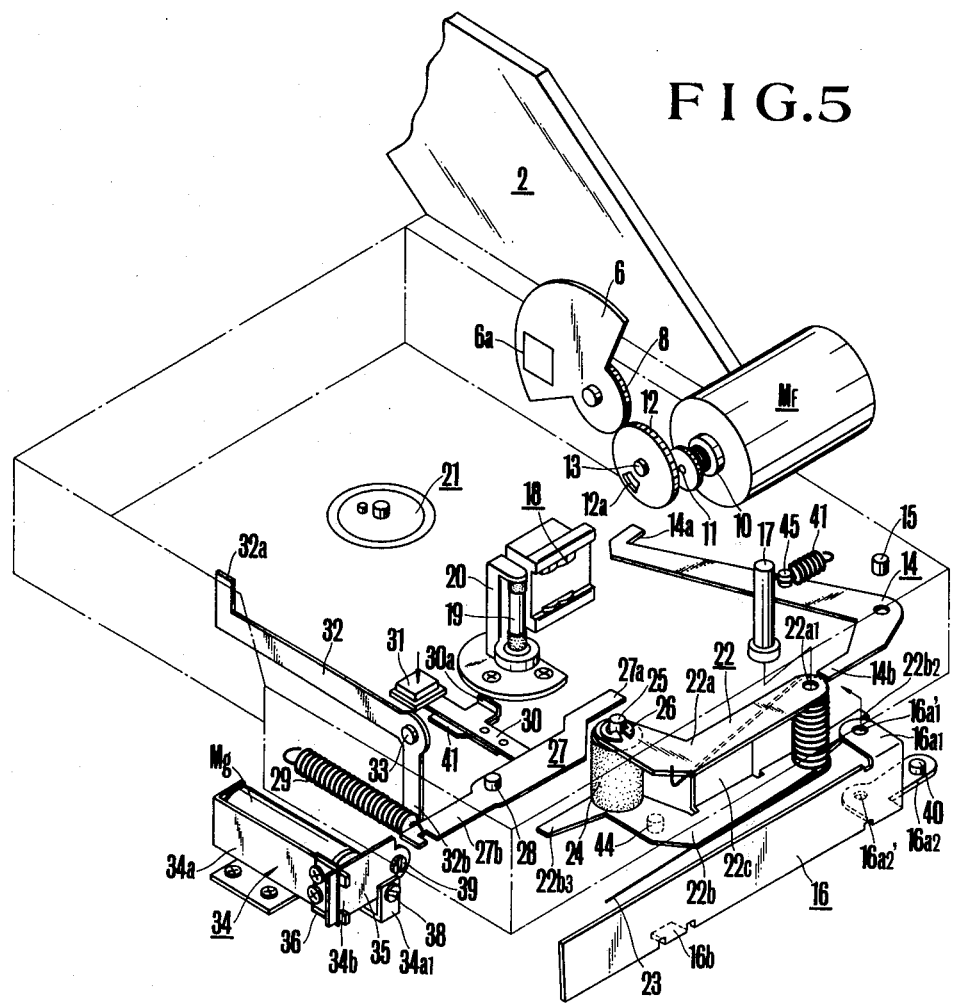
FIG. 5 is a perspective view of the parts shown in FIG. 4.

In FIGS. 4 and 5, the motion picture camera is shown without the housing 1. A cover 2 of the cassette chamber is indicated at 2, as being hinged at its front edge of area on the camera housing 1. With the cover 2 closed, when an operating knob (not shown) on the outside surface of the cover 2 is turned, a pawl disk 3 is rendered effective to lock the cover 2 in engagement at its pawl with a recess (not shown) formed in the rear panel of the camera housing.

A rotary shutter disc 6 is mounted on a shaft 7 to intermittently expose a film gate 1b1 at a rectangular opening 1b1' thereof to scene light in response to rotation of the shaft 7. The film F1 or F2 (FIGS. 1 to 3) is guided along a path by a pair of film alignment abutments on the opposite side of the opening 1b1' and is advanced by the pulldown 108 whose claw projects through and inwardly beyond a slot 1b1" located adjacent the opening 1b1'. The operative connection between the shutter 6 and an electric motor MF includes, as is better understood from FIGS. 6 and 7, a pinion 10 which is freely carried on an output shaft of the motor MF through a friction clutch or spring 11 and meshes with a second pinion 12' rotatably mounted on a shaft 13. The second pinion is affixed to a gear 12 which meshes with a gear 8 fixedly carrying the shutter 6. The motion of the motor MF is also transmitted to the pulldown 108 through an intermediary (not shown).

Figure 6:
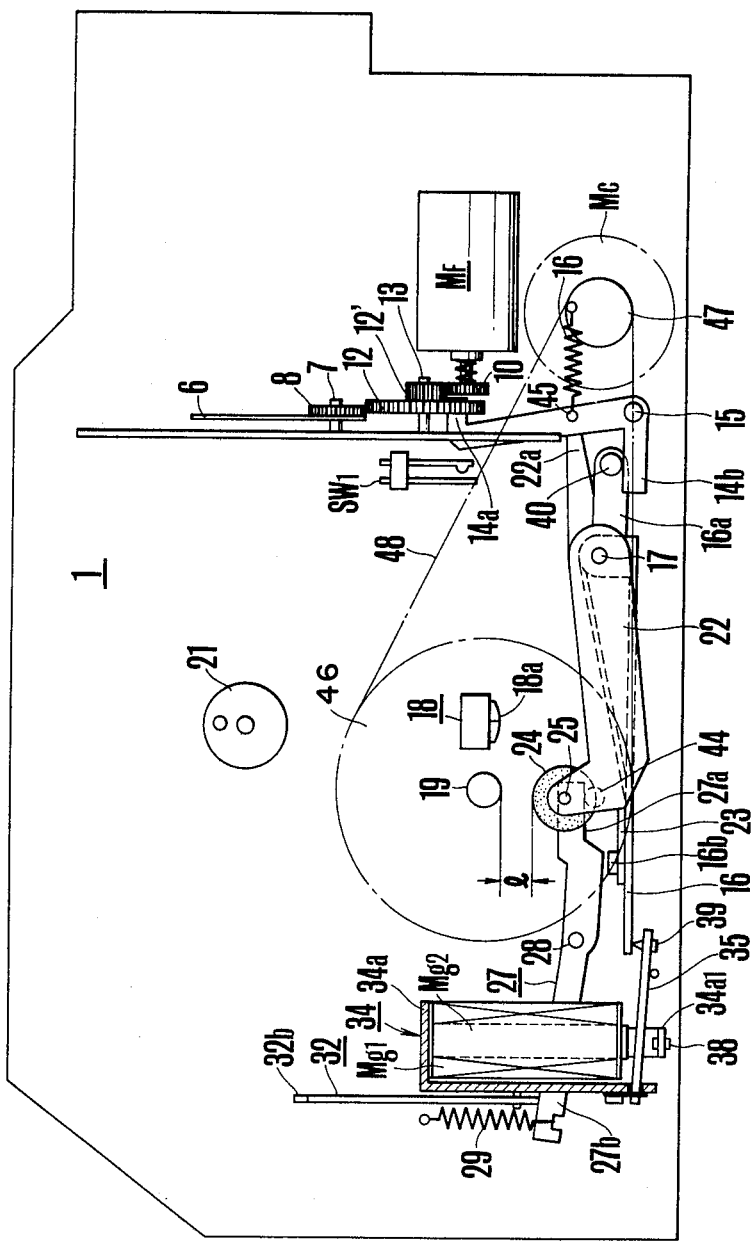
FIGS. 6 and 7 are side elevational views of the parts of FIGS. 3 to 5 in two different operative positions, with FIG. 6 showing the pinch roller spaced apart by a long distance from the capstan as the cover of the cassette receiving chamber is open, and with FIG. 7 showing the pinch roller positioned near the capstan as the cover is closed.
Figure 7:
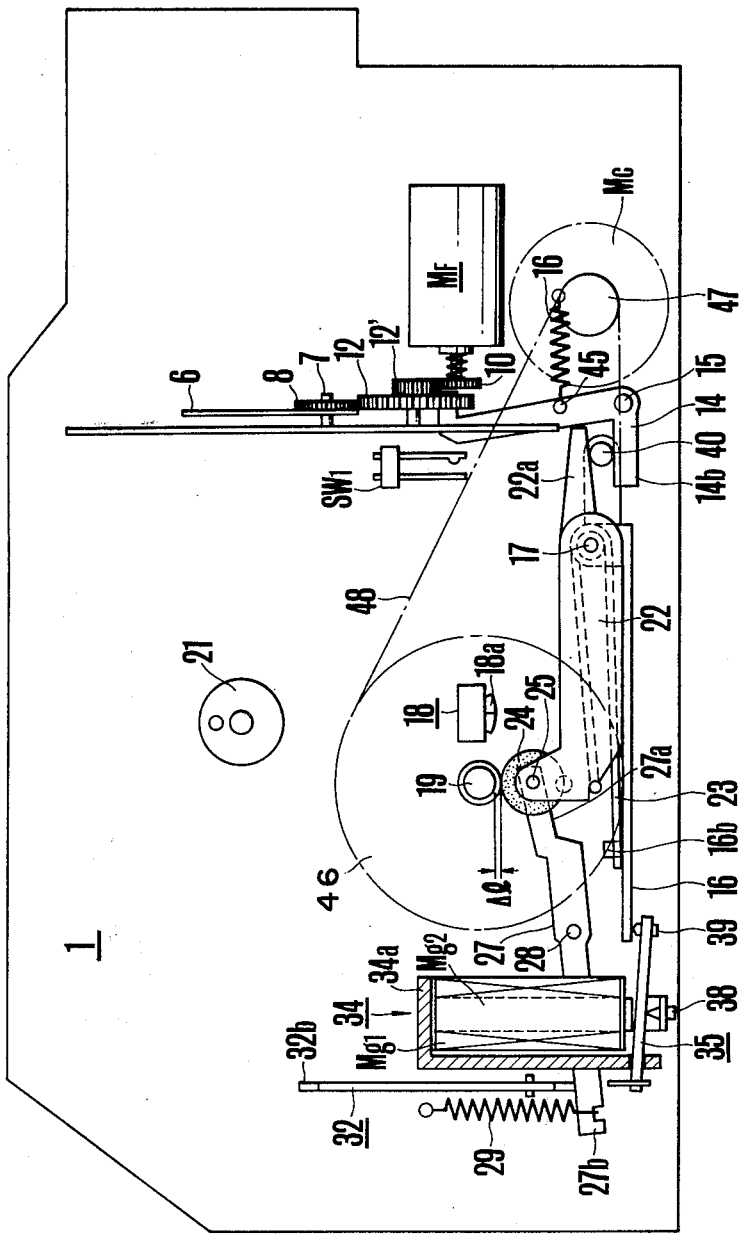

A release and blocking lever 14 is pivoted at a pin 15 fixedly mounted on the camera housing and, when the camera is in the idle position as shown in FIGS. 4, 6 and 7, lies with an upper arm 14a thereof engaged in a stop recess 12a formed in a portion of the gear 12 near the periphery thereof under the action of a spring 45 which is connected between the camera housing 1 and a central pin 41 of the lever 14. A lower arm 14b of the release and blocking lever 14 extends into the path of movement of a pin 40 which is fixedly mounted on a tap 16a2 of a shifting member or plate 16. The shifting plate 16 is pivotally mounted on a shaft 17 which is fixedly mounted on the camera housing 1, and arranged to be cooperative with an electromagnetic actuator 34. Pivotally mounted on the common shaft 17 of the shifting plate 16 is a carrier 22 for a pinch roller 24.

The carrier 22 is constructed with first and second frameworks or plates 22a and 22b of similar shape to each other, as is spaced in parallel orientation by a distance almost equal to the longitudinal length of the pinch roller 24. This separation of the plates 22a and 22b is secured by a third framework 22c of rectangular shape, and enables the pinch roller 24 to freely rotate about a shaft 26 which is affixed between the plates 22a and 22b at the top ends of the upwardly extending portions thereof. In the opposite ends of the plates 22a and 22b there are respective holes 22a1 and 22b2 through which the shaft 17 extends outwardly beyond the holes 16a1' and 16a2' of the shifting plate 16.

To establish an operative connection between the shifting plate 16 and the carrier 22 when the cover 2 is closed, there is provided a mechanism including a helical torsion spring 23 around the shaft 17 to urge the carrier 22 for abutting engagement at a forwardly extending lug thereof against the aforesaid pin 40, as the carrier 22 is turned by the action of the spring 23 in a clockwise direction from the position illustrated in FIG. 6 where the cover 2 is opened. The mechanism further includes a cover sensing lever 32 of L-shape having a probe 32a arranged to project through and outwardly beyond a rectangular hole 1c provided through the wall of the camera housing 1. When the cover 2 is closed, a hump 2a on the back side of the cover 2 pushes the probe 32a, causing the lever 32 to be turned about a pivot pin 33 in a counter-clockwise direction against the force of a spring 29 which urges a two-armed disengaging lever 27 for normally abutting engagement at one arm end 27b on the lower arm 32b of the L-shape lever 32. Therefore, such counter-clockwise movement of the sensing lever 32 in turn causes counter-clockwise movement of the disengaging lever 27 about a pivot pin 28 until the tip 27a of the lever 27 is moved beyond the range of movement of the pin 44, thereby the carrier 22 is allowed to move to the position illustrated in FIG. 7 where the lug 22b2 abuts on the pin 40.

Means is provided for preventing the pinch roller 24 from contacting with the capstan 19 when the used cassette is of the silent type. This means includes a blade spring member 30 fixedly secured at one end to the camera housing 1, a sound cassette sensing member 31 fixedly mounted on the free end of the blade spring 30 and arranged to extend into the cassette chamber at a location such that, when the sound film cassette C2 is seated in the chamber, one of the legs of the cassette C2 can push the sensing member 31 to a downwardly shifted position where a detent pawl 30a upwardly extending from the blade spring 30 is retracted from the path of movement of a projection 22b3 of the second framework 22b of the carrier 22. Thus, the carrier 22 is enabled to bring the pinch roller into resilient contact with the capstan 19. Strictly speaking, the film F2 is pressed against the capstan 19 by the pinch roller 24, in response to energization of the electromagnetic actuator 34, and a switch SW5 arranged to be closed when the blade spring 30 is downwardly shifted.

The electromagnetic actuator 34 includes a magnetic coil Mg1 around an iron core Mg2 (FIGS. 6 and 7), an L-shape mount 34a for the coil and core Mg which is made of magnetic substance and which is fixedly secured to the camera housing 1, an armature 35 pivotally mounted in a forked portion of the mount 34a and having a plate spring 36 positioned adjacent the pivot point to retain the engagement of the armature 35 with the mount 34a, a stopper 38 with a threaded portion thereof engaged in a threaded hole of an L-shape support member 34a1. Member 34a1 constitutes part of the mount 34a, to adjust the range of clockwise movement of the armature 35, and a relative position adjusting member or screw 39 located near the free end of the armature 35 to always engage with the shifting lever 16 so that the distance between the capstan 19 and pinch roller 24 set in the position illustrated in FIG. 7 can be varied by rotating the screw 39.

Figure 8:
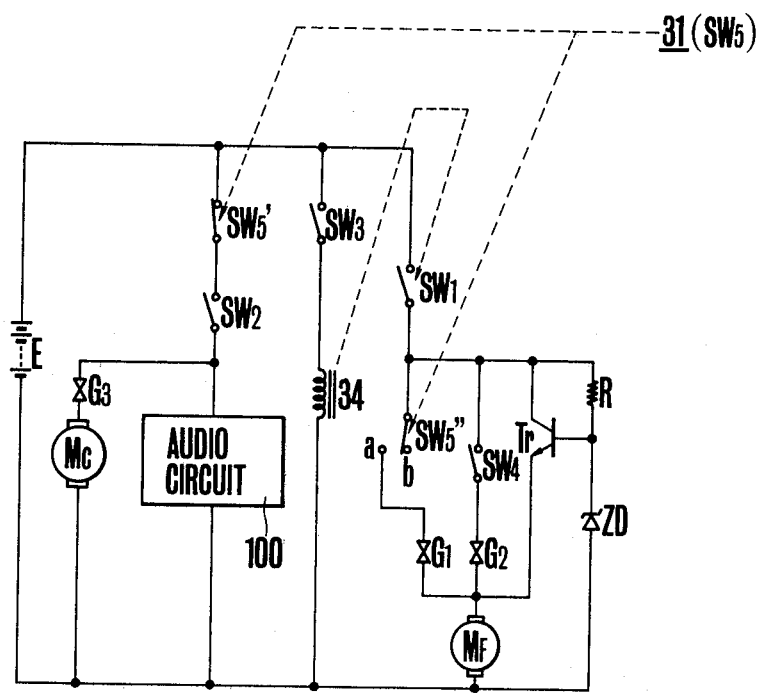
FIG. 8 is an electrical circuit diagram of the camera of FIGS. 3 to 7.

FIG. 8 shows an electrical circuit of the motion picture camera of the invention. In FIG. 8, the same reference characters and numerals have been employed to denote similar parts to those shown in FIGS. 3 to 7. The first trigger switch SW2 and the sound film cassette C2 responsive switch element SW5' are connected in series to each other in an electrical power supply line from a battery E to an audio circuit 100 and also to the winding of the motor Mc through a speed control governor G3, the latter controlling the speed of the motor Mc to transport the film F2 at a constant speed corresponding to 18 frames per second. The second trigger switch SW3 is connected in a power supply line from the battery E to the magnetic winding of the actuator 34, the latter controlling opening and closing operation of a switch SW1 (see FIGS. 4 to 7 also). This switch SW1 is connected in a power supply line from the battery E to the motor MF through selection of either one of first and second film speed control devices. The first film speed control device includes a governor G1 connected between the winding of the motor MF and a second switch element SW5'', the latter being connected in series to the switch SW1. When the associated film cassette is of the silent type, the second switch element SW5'' is set in its "a" position where the governor G1 is rendered effective to control the speed of the motor MF so that the film F1 is advanced by the pulldown claw 108 at a frequency of 18 frames per second. When set in its "b" position for the sound film cassette C2, the governor G1 is no longer effective, but instead the second film speed control device controls the speed of the motor MF to advance the film F2 at a frequency of 16 or 20 frames per second depending upon whether the slack loop detector responsive switch SW4 is open or closed respectively. The second film speed control device includes a governor G2 connected in series with the switch SW4 between the winding of the motor MF and the switch SW1, and a transistor Tr with an emitter connected to the winding MF, with a collector connected to the switch SW1 and with a base connected to a point on connection between a resistor R and a Zener diode ZD, the latter being connected in a reverse direction so that when the switch SW4 is opened, the base-emitter voltage of the transistor Tr becomes lower than the constant voltage determined by the Zener diode ZD.

The operation of the motion picture camera of the construction described above will be explained in detail below. When the chamber 1a lacks any cassette therein and the cover 2 is open as shown in FIGS. 4 to 6, the disengaging lever 27 is set in the clockwise position under the action of the spring 29, and therefore causes the cover sensing lever 32 to be set in the clockwise position where the probe 32a projects outwardly beyond the hole 1c. Since the spring 29 overcomes the helical torsion spring 23, the carrier 22 is also set in the counter-clockwise position by the lever 27 engaging at the end 27a with the pin 44, while the shifting lever 16 supporting one end of the spring 23 at 16b is limited for counter-clockwise movement by the screw 39 on the armature 35. In this position of the shifting lever 16, the release and blocking lever 14 is permitting to engage at the nose 14a in the stop recess 12a under the action of the spring 45. Because of the lack of the sound film cassette C2 in the chamber 1a, the sensor 31 is allowed to project into the chamber 1a, and therefore the blade spring 30 is in the raised position where the detent pawl 30a extends into the path of movement of the projection 22b3 of the carrier 22, and where the switch SW5 also is open.

(1) When the silent film cassette C1 is loaded in the chamber 1a, actuation of the sensor 31 does not occur because of the uncovering of an opening 1d beyond which the sensor 31 extends into the chamber 1a. Next, when the cover 2 nears the closing of the chamber 1a, the hump 2a starts to push the projection 32a. Upon further movement of the cover 2 with simultaneous counter-clockwise movement of the lever 32, the disengaging lever 27 is turned about the pin 28 in the counter-clockwise direction against the force of the spring 29 to a point beyond the range of movement of the carrier 22. The carrier 22, at first, follows up the disengaging lever 27 under the action of the spring 23 which maintains the pin 44 in abutting engagement with the lever end 27a, while the shifting lever 16 is retained in engagement with the armature 35 through the position adjusting pin 39 to exert a reaction for the carrier 22. Since the blade spring 30 remains in the raised position, however the detent projection 30a stops the carrier 22 from further clockwise movement which would otherwise effect resilient contact of the pinch roller 24 with the capstan 19 when the loaded cassette is of the sound recording type C2. The spacing of the pinch roller 24 apart from the capstan 19 is associated with the opening of the switch SW5 which causes the first and second switch elements SW5' and SW5" to be in the open and "a" position where the first speed control device is rendered effective and where the sound recording system including the circuit 100 and the motor Mc is cut off from the battery E.

Upon depression of the trigger button 106 to the first stroke, the switch SW2 is closed without causing operation of the sound recording system. By the second stroke, the switch SW3 is closed to start energization of the electromagnetic actuator 34 with power supply from the battery E. As the armature 35 is driven to turn about the point 34b in the counter-clockwise direction, the shifting lever 16 is turned about the shaft 17 in the clockwise direction, causing the release and blocking lever 14 to turn about the pin 15 in the counter-clockwise direction against the force of the spring 45 by the pin 40 engaging the arm 14b until the opposite arm 14a is retracted from the stop recess 12a to permit rotation of the shutter drive gear 12 and to close the switch SW1, while the carrier 22 is maintained stationary during the positive movement of the shifting lever 16. Upon closure of the switch SW1, the motor MF starts to rotate with power supply from the battery E, and motion of the motor MF is transmitted to the rotary shutter disc 6 through the gear train 10, 12', 12 and 7, to the pulldown 108 through an intermediary not shown, and to a spool drive 21 through a not shown intermediary. In this manner, the film F1 is intermittently advanced past the film gate 1b at a frequency adjusted by the governor G1 to about 18 frames/sec., and after having travelled as guided by the idlers, is wound up on the takeup spool driven by the drive 21. It is to be noted here that the pinch roller 24 and the capstan 19 are maintained spaced apart from each other during the picture taking operation to protect the pinch roller 24 from plastic deformation and abrasion.

When the operator removes his finger from the trigger button 106, the switch SW3 is opened again to de-energize the magnetic winding Mg1, so that the shifting lever 16 is driven by the combined force of the springs 23 and 45 to return to the initial position. The release and blocking lever 14 follows up the shifting lever 16 so that when the stop recess 12a comes into alignment with the projection 14a, the blocking lever 14 is turned in the clockwise direction under the action of the spring 45 to arrest the gear 12 together with the pulldown 108 and the spool drive 21. Such movement of the lever 14 also causes the switch SW1 to be opened to cut off the motor MF from the battery E. In order to remove the cassette C1 from the chamber 1a, the operator turns to open the cover 2. Because the force exerted to maintain the lever 32 in the counter-clockwise position disappears, the disengaging lever 27 is acted on the pin 44 and moves the carrier 22 downwards by the spring 29 against the force of the spring 23.

(2) For sound motion picture photography, when the sound film cassette C2 is inserted into the chamber 1a, the sensor 31 detects that cassette C2 and then the blade spring 30 is shifted downwards with the detent projection 30a retracted from the path of movement of the arm 22b3. The switch SW5 is closed, and the switch elements SW5' and SW5" are set to the closed and "b" positions respectively.

When the cover 2 is closed, the disengaging lever 27 is moved away from the pin 44 so that the carrier 22 is turned clockwise while the arm 22b3 runs over the detent pawl 30a, but until this time the pinch roller 24 is prevented from pressing the film F2 against the capstan 19 because the lug 22b2 is brought into abutting engagement on the pin 40, as shown in FIG. 7.

Upon depression of the trigger button 106 to the first stroke, the switch SW2 is closed to start operation of the audio circuit 100 and the motor Mc with power supply from the battery E through the closed switches SW5' and SW2. Although the motor Mc rotates the capstan 19, the film F2 is not transported past the sound recording station yet. Upon further depression of the trigger button 106 to the second stroke, the switch SW3 is closed to energize the magnetic winding Mg1 of the actuator 34. Thus, the shifting lever 16 moves not only the release and blocking lever 14 as in the silent motion picture photography but also the carrier 22 to press the film F2 against the capstan 19. The start of continuous transportation of the film F2 past the magnetic head 18 is followed after a slight time of lag by the start of intermittent advancement of the film F2 past the exposure aperture 1b1' so that no slack loop of the film F2 is formed between the magnetic head 18 and the exposure aperture to set the switch SW4 in the closed position where the motor MF is driven for rotation at a speed corresponding to 20 frames/sec. during the first half cycle of claw operation, that is, the downward movement of the pulldown claw 108, while the other motor Mc is driven for rotation at a speed corresponding to 18 frames/sec. During the first half cycle of claw operation, therefore, the length of that portion of the film F2 which occupies the channel between the film gate 1b and the magnetic head 18 is being increased to a level large enough to open the switch SW4. In the second half cycle, the switch SW4 is opened to change the speed of the motor MF to 16 frames/sec. a slack loop formed during the first half cycle is then caused to disappear before the start of a second cycle of claw operation. In other words, the speed of the motor MF varies from 20 to 16 frames/sec. during each cycle of claw operation, with the average speed being adjusted to the speed of the motor Mc, that is, 18 frames/sec.

After a continuous series of picture frames have been exposed, the operator will remove his finger from the trigger button 106 to de-energize the electromagnetic actuator 34. As the armature 35 is allowed to move away from the yoke Mg2, the shifting lever 16 is turned counter-clockwise by the action of the spring 45 alone, and the carrier 22 is also turned counter-clockwise in engagement at its lug 22b2 with the pin 40 to the position illustrated in FIG. 7. The stoppage of the shutter 6 also occurs in a manner similar to that described in connection with the silent motion picture photography.

It will be seen from the foregoing description that the present invention provides a motion picture camera having selective control of actuation of the sound recording system thereof depending upon whether the associated cassette is of the silent or sound film type, and, upon setting of the sound film cassette in the chamber therefor, the invention renders it possible to jointly actuate and jointly release the motion picture taking system and the sound recording system in response to an actuation and to a release, respectively of a single electromagnetic actuator. This results in the associated advantages of reducing the size and weight of the camera and of saving the consumption of electrical energy of the battery.

What is claimed is:

1. A sound motion picture camera for use with a sound film, comprising:
   (a) a casing having a film chamber for receiving the film, said chamber having a picture image recording location for recording image information on the film and a sound recording location for recording sound information on the film;
   (b) trigger means for controlling actuation of said camera from the outside of said casing;
   (c) first feed means in said chamber for transporting the film in a direction of said sound recording location along a film path of said image recording location;
   (d) sound recording means in said chamber positioned for cooperation with said film at said sound recording location;
   (e) sound feed means in said chamber engageable with said film at said sound recording location for transporting said film past said sound recording means at a substantially constant speed, said second feed means having:
      a capstan positioned within the sound recording location; and
      a pinch roller positioned opposite to the capstan sandwiching the film path of said recording location;
   (f) shifting means causing said capstan and said pinch roller spaced apart from each other to be brought into resilient contact with each other to engage the film with said second feed means, said shifting means having:
      a carrier member rotatably supporting said pinch roller and rotatably mounted on a shaft;
      a pressure member rotatable about said shaft;
      biasing means arranged between said carrier member and said pressure member to expel both in the opposite direction of each other; and
      restraining means for restraining said pressure member and said carrier member from movement beyond a maximum separation;
   (g) drive means for actuating said first and second feed means, said drive means including at least a motor;
   (h) movable shutter means in said casing arranged to cooperate with said first feed means;
   (i) release means in said casing for controlling actuation and stop of said shutter means and said first feed means;
   (j) only one electromagnetic means in said housing capable of controlling operation of said release means and said shifting means together with each other;
   (k) control means which holds said pinch roller in a position away from said capstan and shifts said pinch roller from said position to another position close to said capstan when said camera is loaded with a sound film magazine;
   (l) stopping means for stopping a pressure member in a predetermined position when said pinch roller is in the position away from said capstan; and
   (m) second biasing means for biasing said pressure member to said stopping means.

2. A sound motion picture camera according to claim 1, wherein said drive means has a first motor driving circuit means including a motor operatively coupled with said first feed means and also including a second motor driving circuit means having a motor operatively coupled with said second feed means.

3. A sound motion picture camera according to claim 2, wherein said shutter means has:
   at least a rotating shutter;
   a stopper means rotatable in cooperation with said shutter; and
   a blocking means selectively engageable to said stopper means and controlling allowance and stoppage of rotation of said shutter through said stopper means, thereby said engagement and disengagement of said blocking means is controlled by said electromagnetic means.

4. A sound motion picture camera according to claim 3, wherein said blocking means and said shifting means are mechanically linked to each other in cooperative relation, and said shifting means is displaceable with a shaft as a fulcruming point between a position (1) where said capstan and said pinch roller are spaced apart from each other and said blocking means is engaged with said stopper means and a position (2) where said capstan and said pinch roller are in resilient contact with each other and said blocking means is spaced from said stopper.

5. A sound motion picture camera according to claim 3, wherein said drive means has a first switch means for controlling electrical power supply to said firsst motor driving circuit means and a second switch means for controlling electrical power supply to said second motor driving circuit means, said second switch means thereby being controlled by said trigger means, and said first switching means being controlled by said engaging and disengaging operation.

6. A sound motion picture camera according to claim 5, wherein said second switch means also serves to control electrical power supply to said sound recording means.

7. A sound motion picture camera according to claim 5, wherein said electromagnetic means has a switch means for controlling electrical power supply to an electromagnet device and said electromagnet device.

8. A sound motion picture camera according to claim 7, wherein said trigger means is capable of controlling said first switch means and said electromagnetic means, whereby said first switch means is controlled by the first step of operation of said trigger means, and said first switch means and said switch means for said electromagnetic means are controlled by the second step thereof.

9. A motion picture camera for use with a sound film, comprising:
   (a) a casing having:
      a film chamber for receiving the film, said chamber having a picture image recording location and a sound recording location; and
      an image gate being opened at a position opposite to the image recording location of the chamber;
   (b) trigger means for actuating said camera from the outside of said casing;
   (c) rotating shutter means in said casing for selectively permitting entrance of light from said image gate to the inside of said chamber;
   (d) release means in said casing for controlling operation of said shutter means, said release means having:

stopper means cooperative with said shutter means; and blocking means selectively engageable with said stopper means to control operation of said shutter means;

(e) first feed means in said chamber for intermittently transporting said film in a direction of said sound recording location along a film path of said image gate in said image recording location, said first feed means being mechanically linked to said shutter means in cooperative relation;

(f) sound recording means in said chamber positioned for cooperation with said film at said sound recording location;

(g) second feed means in said chamber engageable with said film at said sound recording location for transporting said film past said sound recording means at a substantially constant speed, said second feed means having:

a capstan positioned within the sound recording location; and a pinch roller positioned opposite to said capstan sandwiching the film path of said sound recording location;

(h) shifting means causing said capstan and said pinch roller spaced apart from each other to be brought into resilient contact with each other to engage the film with said second feed means, said shifting means having:

a carrier member rotatably supporting said pinch roller and rotatably mounted on a shaft;

a pressure member rotatable about said shaft;

biasing means arranged between said carrier member and said pressure member to expel both in the opposite direction of each other; and restraining means for restraining said pressure member and said carrier member from movement beyond maximum separation;

(i) drive means for actuating said shutter means, said first feed means and said second feed means, said drive means including at least a motor;

(j) only one electromagnetic means in said casing capable of controlling said release means and said shifting means, said electromagnetic means being actuated in response to operation of said trigger means;

(k) control means which holds said pinch roller in a position away from said capstan and shifts said pinch roller from said position to another position close to said capstan when said camera is loaded with a sound film magazine;

(l) stopping means for stopping a pressure member in a predetermined position when said pinch roller is in the position away from said capstan; and (m) second biasing means for biasing said pressure member to said stopping means.

10. A motion picture camera for alternatively exposing a silent film contained in a cassette of a first type and a sound film contained in a casssette of a second type differing in shape from that of said first type, the film being accessible with either type of cassette at a picture image recording location for illumination and with said second type of cassette also at a sound recording location for sound recording, comprising:

(a) a casing having a cassette-receiving chamber and an image gate opening into said chamber;

(b) trigger means for actuating said camera from the outside of said casing;

(c) first feed means in said chamber engageable with the film of an inserted cassette at said picture image recording location for transporting said film past said image gate;

(d) first drive means for actuating said first feed means, said drive means including a motor operatively coupled with said first feed means;

(e) movable shutter means in said casing for permitting entrance of light from said image gate to the inside of said chamber, said shutter means being mechanically linked to said first food means so as to cooperate with each other;

(f) release means in said casing for controlling operation of said shutter means, said release means having:

stopper means cooperating with said shutter means; and blocking means controlling actuation of said shutter means;

(g) sound recording means in said chamber positioned for cooperation with the film of an inserted cassette of said second type at said sound recording location;

(h) second feed means in said chamber engageable with the film of an inserted cassette of said second type at said sound recording location for transporting the film past said sound recording means at a substantially constant speed, said second feed means having:

a capstan positioned within the sound recording location; and a pinch roller positioned opposite to said capstan sandwiching the film path of said sound recording location;

(i) second drive means for actuating said second feed means, said drive means including a motor operatively coupled with said second feed means;

(j) shifting means causing said capstan and said pinch roller spaced apart from each other to be brought into resilient contact with each other to engage said film with said second feed means, said shifting means having:

a carrier member rotatably supporting said pinch roller and rotatably mounted on a shaft;

a pressure member rotatable about said shaft;

biasing means arranged between said carrier member and said pressure member to expel both in the opposite direction of each other; and restraining means for restraining said pressure member and said carrier member from movement beyond a maximum separation;

(k) only one electromagnetic means in said casing capable of controlling said release means and said shifting means, said electromagnetic means being actuated in response to operation of said trigger means;

(l) detecting means in said casing for detecting the presence of a cassette of said second type in said chamber;

(m) control means responsive to said detecting means for permitting said shifting means to bring said capstan and said pinch roller into resilient contact with each other in response to operation of said electromagnetic means when said second type cassette is present, and for forcibly hindering said capstan and said pinch roller to be in resilient contact by said shifting means when said second type cassette is not present;

(n) stopping means for stopping a pressure member in a predetermined position when said pinch roller is in the position away from said capstan; and
(o) second biasing means for biasing said pressure member to said stopping means.

11. A sound motion picture camera for use with a sound film, comprising:
   (a) a casing having a film chamber for receiving the film, said chamber having a picture image recording location for recording image information on the film and a sound recording location for recording sound information on the film;
   (b) trigger means for controlling actuation of said camera from the outside of said casing;
   (c) first feed means in said chamber for transporting the film in a direction of said sound recording location along a film path of said image recording location;
   (d) sound recording means in said chamber positioned for cooperation with said film at said sound recording location;
   (e) second feed means in said chamber engageable with said film at said sound recording location for transporting said film past said sound recording means at a substantially constant speed, said second feed means having:
      a capstan positioned within the sound recording location; and
      a pinch roller positioned opposite to the capstan sandwiching the film path of said recording location;
   (f) shifting means causing said capstan and said pinch roller spaced apart from each other to be brought into resilient contact with each other to engage the film with said second feed means, said shifting means having:
      a carrier member rotatably supporting said pinch roller and rotatably mounted on a shaft;
      a pressure member rotatable about said shaft; and
      biasing means arranged between said carrier member and said pressure member to expel both in the opposite direction of each other;
   (g) an electromagnetic means which acts on said pressure member to move said carrier member through said biasing means to have said pinch roller which is disposed thereon come into contact with said capstan;
   (h) control means which holds said pinch roller in a position away from said capstan and shifts said pinch roller from said position to another position close to said capstan when said camera is loaded with a sound film magazine;
   (i) stopping means for stopping said pressure member in a predetermined position when said pinch roller is in the position away from said capstan; and
   (j) second biasing means for biasing said pressure member to said stopping means.

12. A sound motion picture camera for use with a sound film, comprising:
   (a) a casing having a film chamber for receiving the film, said chamber having a picture image recording location for recording image information on the film and a sound recording location for recording sound information on the film;
   (b) trigger means for controlling actuation of said camera from the outside of said casing;
   (c) first feed means in said chamber for transporting the film in a direction of said sound recording location along a film path of said image recording location;
   (d) sound recording means in said chamber positioned for cooperation with said film at said sound recording location;
   (e) second feed means in said chamber engageable with said film at said sound recording location for transporting said film past said sound recording means at a substantially constant speed, said second feed means having:
      a capstan positioned within the sound recording location; and
      a pinch roller positioned opposite to the capstan sandwiching the film path of said recording location;
   (f) shifting means causing said capstan and said pinch roller spaced apart from each other to be brought into resilient contact with each other to engage the film with said second feed means, said shifting means having:
      a carrier member rotatably supporting said pinch roller and rotatably mounted on a shaft;
      a pressure member rotatable about said shaft;
      biasing means arranged between said carrier member and said pressure member to expel both in the opposite direction of each other;
   restraining means for restraining said pressure member and said carrier member from movement beyond a maximum separation;
   (g) an electromagnetic means which is arranged to be actuated in response to an operation of said trigger means and is operatively coupled with said pressure member, said electromagnetic means being arranged to move said carrier member through said biasing means to have said pinch roller come into resilient contact with said capstan;
   (h) control means which holds said pinch roller in a position away from said capstan and shifts said pinch roller from said position to another position close to said capstan when said camera is loaded with a sound film magazine;
   (i) stopping means for stopping a pressure member in a predetermined position when said pinch roller is in the position away from said capstan; and
   (j) second biasing means for biasing said pressure member to said stopping means.

13. A sound motion picture camera for use with a sound film, comprising:
   (a) a casing having a film chamber for receiving the film, said chamber having a picture image recording location and a sound recording location;
   (b) trigger means for actuating said camera from the outside of said casing;
   (c) first feed means in said chamber for intermittently transporting the film in a direction of said sound recording location along a film path of said image recording location;
   (d) rotating shutter means in said casing cooperative with said first feed means;
   (e) release means in said casing for controlling actuation of said shutter means, said release means having:
      stopper means cooperative with said shutter means; and
      blocking means selectively engageable with and disengageable from said stopper means to control operation of said shutter means;

(f) sound recording means in said chamber positioned for cooperation with said film at said sound recording location;

(g) second feed means in said chamber engageable with said film at said sound recording location for transporting said film past said sound recording means at a substantially constant speed, said second feed means having:
- a capstan positioned within the sound recording location; and
- a pinch roller positioned opposite to said capstan sandwiching the film path of said sound recording location;

(h) shifting means causing said pinch roller to be moved from a spaced position relative to said capstan to a resilient contact therewith, said shifting means having:
- pressure member means rotatable about a shaft, said blocking means being mechanically linked to said pressure member;
- carrier member means rotatably supporting said pinch roller, and rotatably mounted on said shaft; and
- first biasing means for urging said carrier member means and said pressure member means in the opposite direction to each other; and
- restraining means for restraining said pressure member means and said carrier member means from movement beyond a maximum separation;

(i) a second biasing means for urging said blocking means for engagement with said stopper means and for urging said shifting means to maintain said pinch roller in a spaced position relative to said capstan; and (j) only one electromagnetic means in said casing causing said shifting means to perform reverse operation of said blocking means against the force of said second biasing means, said electromagnetic means being operatively coupled to said pressure member means, and being actuated in response to operation of said trigger means.

14. A motion picture camera for alternatively exposing a silient film contained in a cassette of a first type and sound film contained in a cassette of a second type differing in shape from that of said first type, the film being accessible with either type of cassette at a picture image recording location for illumination and with said second type of cassette also at a sound recording location for sound recording, comprising:

(a) a casing having a cassette-receiving chamber and an image gate opening into said chamber;

(b) a cover for selectively covering and uncovering an opening for insertion of said film to said chamber therethrough;

(c) trigger means for actuating said camera from the outside of said casing;

(d) first feed means in said chamber engageable with the film of an inserted cassette at said picture image recording location for transporting said film past said image gate;

(e) movable shutter means in said casing for selectively permitting entrance of light from said image gate to the inside of said chamber, said shutter means being mechanically linked to said first feed means in cooperative relation;

(f) release means in said casing for controlling actuation of said shutter means, said release means having:
- a stopper means cooperative with said shutter means; and
- a blocking means selectively engageable with and disengageable from said stopper means to control operation of said shutter means;

(g) sound recording means in said chamber positioned for cooperation with the film of an inserted cassette of second type at said sound recording location;

(h) second feed means in said chamber engageable with the film of an inserted cassette of said second type at said sound recording location for transporting the film past said sound recording means at a substantially constant speed, said second feed means having:
- a capstan positioned within the sound recording location; and
- a pinch roller positioned opposite to said capstan sandwiching the film path of said sound recording location;

(i) drive means for actuating said first and second feed means, said drive means including at least a motor;

(j) shifting means casing said capstan and said pinch roller spaced from each other to be brought into resilient contact with each other to engage said film with said second feed means, said shifting means having:
- pressure means rotatable about a shaft as a pivot point, and mechanically linked to said shifting means;
- carrier member means rotatably supporting said pinch roller and rotatably mounted on said shaft;
- first biasing means for urging said pressure member means and said carrier member means in the opposite direction to each other; and
- restraining means for restraining said pressure member means and said carrier member means from movement beyond a maximum separation;

(k) second biasing means for urging said blocking means in a direction toward said stopper means and for urging said shifting means to maintain said pinch roller in a spaced relation to said capstan;

(l) control means for displacing said shifting means to a ready position against the force of said second biasing means in response to closure of said cover;

(m) electromagnet means for controlling release of said release means and displacement of said shifting means from said ready position to an active position where said pinch roller is in resilient contact with said capstan;

(n) detecting means in said casing for detecting the presence of a cassette of said second type in said chamber; and (o) control means responsive to said detecting means for permitting said shifting means to bring said capstan and said pinch roller to resilient contact with each other in response to operation of said electromagnet means when said second type cassette is present and for forcibly hindering said shifting means to be displaced to a position where said pinch roller is in resilient contact with said capstan when said second type cassette is absent.

* * * * *